United States Patent
Karasawa

[19]

[11] Patent Number: 5,940,640
[45] Date of Patent: Aug. 17, 1999

[54] SHUTTER DEVICE AND CAMERA EQUIPPED WITH THE SAME

[75] Inventor: Akira Karasawa, Kawasaki, Japan

[73] Assignee: Canon Kabushiki Kaisha, Tokyo, Japan

[21] Appl. No.: 09/036,460

[22] Filed: Mar. 6, 1998

[30] Foreign Application Priority Data

Mar. 11, 1997 [JP] Japan ................................... 9-072792

[51] Int. Cl.⁶ .............................. G03B 7/26; G03B 9/08
[52] U.S. Cl. ........................................... 396/301; 396/466
[58] Field of Search .................................... 396/248, 246, 396/301, 466, 465

[56] References Cited

U.S. PATENT DOCUMENTS

| | | | |
|---|---|---|---|
| 3,726,199 | 4/1973 | Alfredsson et al. | 396/466 |
| 3,953,867 | 4/1976 | Kondo | 396/301 X |
| 3,971,053 | 7/1976 | Maida | 396/466 |
| 4,129,370 | 12/1978 | Ishiguro et al. | 396/466 |

*Primary Examiner*—W. B. Perkey
*Attorney, Agent, or Firm*—Robin, Blecker & Daley

[57] ABSTRACT

A shutter device having a first light blocking structure arranged to initiate an exposure and a second light blocking structure arranged to terminate the exposure, includes a first energy storage element arranged to store electric energy for causing the first light blocking structure to start operating, a second energy storage element arranged to store electric energy for causing the second light blocking structure to start operating, and a charging control circuit arranged to effect control of charging of the first energy storage element and the second energy storage element, wherein the charging control circuit varies the control of charging in accordance with a set exposure time.

28 Claims, 6 Drawing Sheets

SHUTTER DEVICE AND CAMERA EQUIPPED WITH THE SAME

BACKGROUND OF THE INVENTION

1. Field of the Invention

The present invention relates to an electromagnetically-driven shutter or a camera having the electromagnetically-driven shutter, and more particularly to an electromagnetically-driven shutter arranged to use electric energy stored in capacitors, or a camera having such a shutter.

2. Description of Related Art

The shutter of the type to be operated with electric energy stored in capacitors must be arranged to accurately and surely drive electromagnets or the like to lock and unlock a leading blade (a first light blocking structure provided for initiating an exposure) and a trailing blade (a second light blocking structure provided for terminating an exposure) of the shutter. To meet this requirement, it has generally been practiced to have both a leading blade driving capacitor and a trailing blade driving capacitor charged with electricity until immediately before allowing the leading blade to travel for an exposure.

However, since the charging action is performed on the trailing blade driving capacitor only until immediately before the commencement of travel of the leading blade, the level of electric charge stored in the trailing blade driving capacitor comes to drop too much in the event of an exposure over a long period of time, like in the case of celestial photography.

Since it is a property of a capacitor to make a spontaneous discharge, a voltage stored in the capacitor comes to drop when it is left intact for a long period of time. FIG. 4 shows in a graph the characteristic of spontaneous discharge of the conventional capacitor. In FIG. 4, the voltage is shown on the ordinate axis and time is shown on the abscissa axis of the graph. A curve 31 represents a spontaneous discharge taking place at temperature of 25° C. while a curve 32 represents a spontaneous discharge taking place at temperature of 85° C. As apparent from this graph, the voltage drops with the lapse of time. The voltage drop becomes faster accordingly as temperature is increased by a high ambient temperature or internal heat build-up of component elements in use. Therefore, the capacitor must be recharged to replenish it with energy to make up for the amount of a loss caused by the spontaneous discharge.

Further, it is conceivable to prevent such a loss of energy by charging the trailing blade driving capacitor further until immediately before the trailing blade is allowed to travel after the travel of the leading blade while the leading blade driving capacitor is charged until immediately before the travel of the leading blade.

According to this charging method, however, the trailing blade driving capacitor is continuously charged until immediately before the travel of the trailing blade even when its spontaneous discharge has not yet begun. Besides, in the event of a long exposure, such as bulb photography or the like, a charging process tends to be carried on over an unnecessarily long period of time to cause a mere waste of electric energy.

BRIEF SUMMARY OF THE INVENTION

It is an object of the invention to provide a shutter device or a camera using the shutter device which is arranged to solve the problems of the prior art described in the foregoing.

To attain this object, in accordance with one aspect of the invention, there is provided a shutter device having a leading blade and a trailing blade, which comprises a first capacitor arranged to store electric energy for causing the leading blade to start operating, a first electromagnet arranged to, when receiving the electric energy stored in the first capacitor, unlock the leading blade so as to cause the leading blade to start operating, a second capacitor arranged to store electric energy for causing the trailing blade to start operating, a second electromagnet arranged to, when receiving the electric energy stored in the second capacitor, unlock the trailing blade so as to cause the trailing blade to start operating, and a charging control circuit arranged to effect control of charging of the first capacitor and the second capacitor, wherein the charging control circuit stops charging the first capacitor and the second capacitor before the leading blade starts operating and, then, charges again the second capacitor before the trailing blade starts operating.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
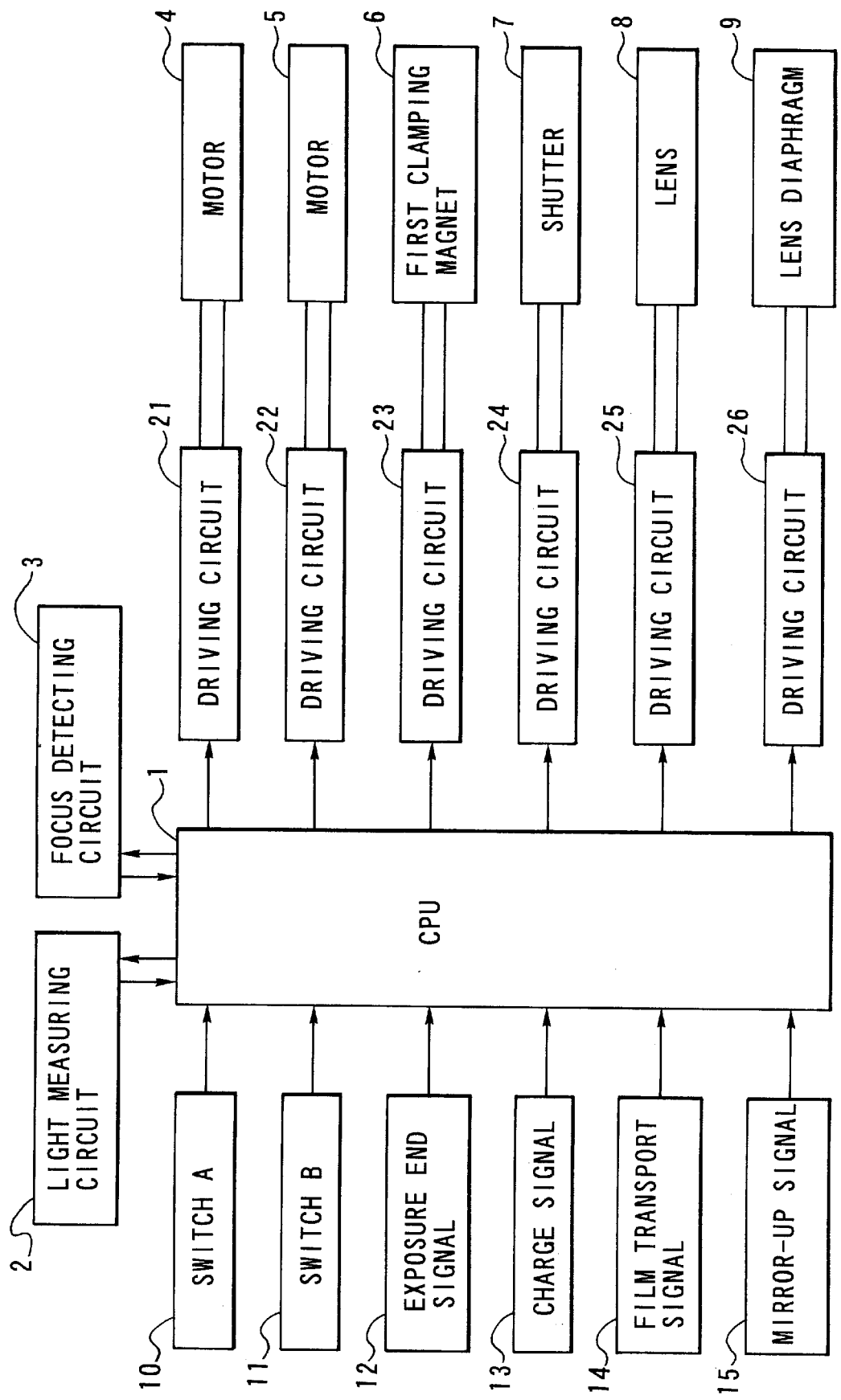
FIG. 1 is a block diagram showing a control system of a camera arranged according to an embodiment of the invention.
Figure 2:
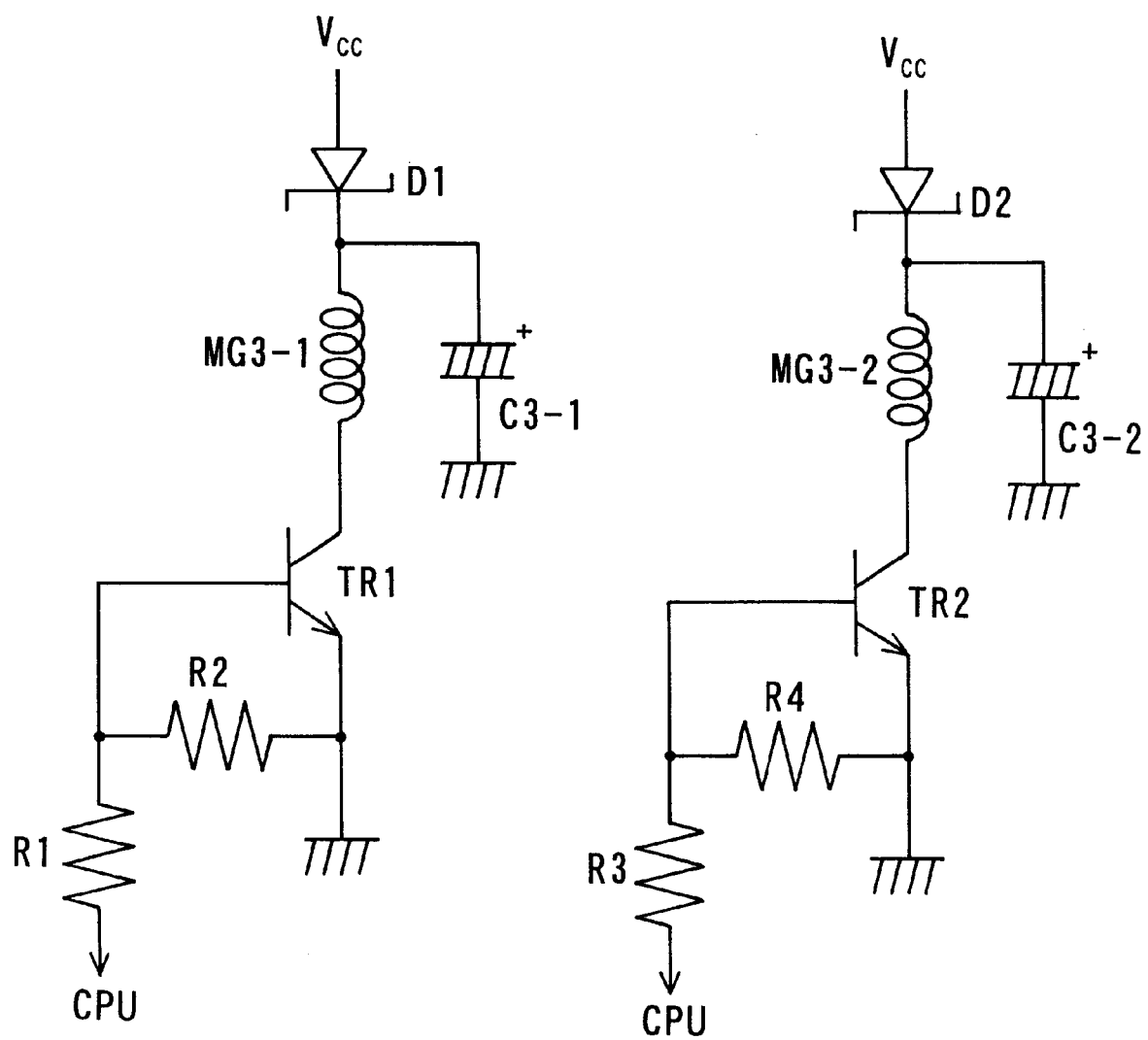
FIG. 2 is a circuit diagram showing a shutter driving circuit included in the camera shown in FIG. 1.
Figure 3:
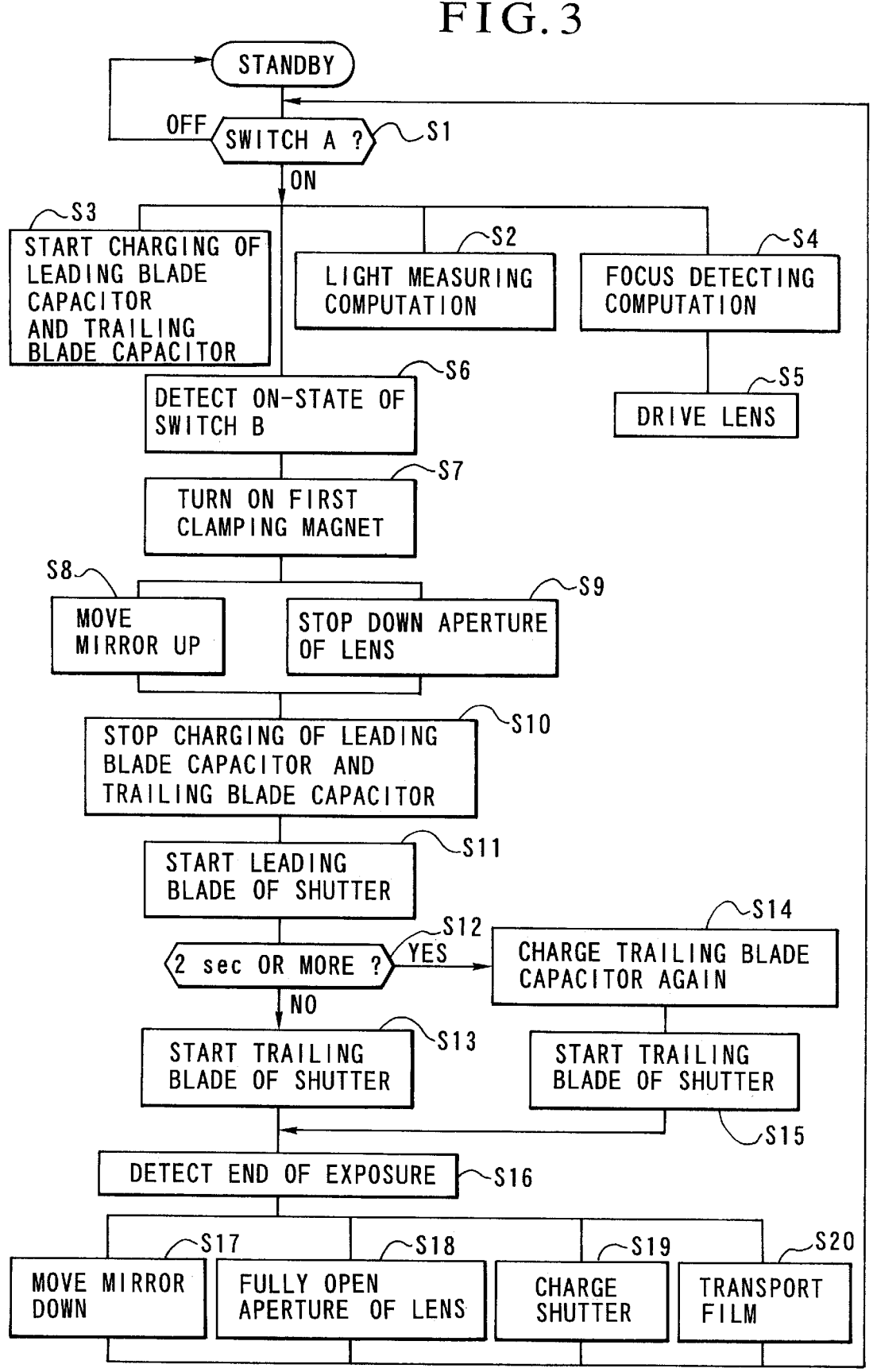
FIG. 3 is a flow chart showing an operation of the camera shown in FIG. 1.
Figure 4:
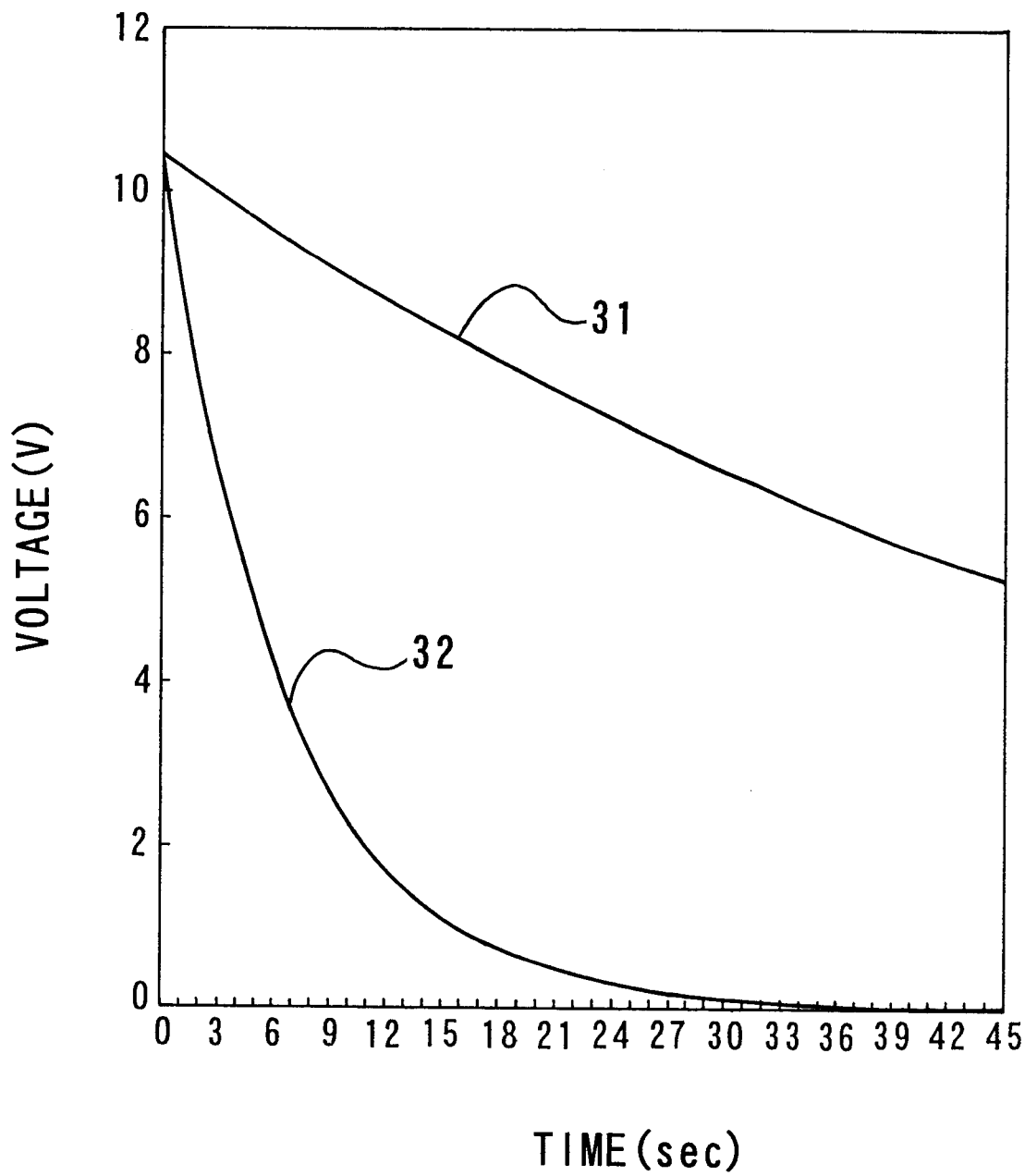
FIG. 4 shows a discharge characteristic of the conventional capacitor.

FIG. 1 is a block diagram showing a control system of a camera arranged according to an embodiment of the invention. FIG. 2 is a circuit diagram showing a shutter driving circuit included in the camera shown in FIG. 1. FIG. 3 is a flow chart showing an operation of the camera shown in FIG. 1.

Referring to FIG. 1, the camera is provided with a CPU (central processing unit) 1, a light measuring circuit 2, a focus detecting circuit 3, a driving circuit 21 arranged to drive a motor 4 which is arranged to charge a shutter 7, etc., a driving circuit 22 arranged to drive a motor 5 which is arranged to transport a film, a driving circuit 23 arranged to drive a first clamping magnet 6 which is arranged to start a sequence of mechanical actions of the camera, a driving circuit 24 arranged to drive the shutter 7, a driving circuit 25 arranged to drive a lens 8 for adjustment of focus, and a driving circuit 26 arranged to drive a lens diaphragm 9.

The operation of the camera as a whole is first briefly described as follows. A switch A 10 turns on when a release button which is not shown but is disposed on the side of a camera body is pushed halfway. The on-state of the switch A 10 is detected by the CPU 1. Upon detection of this state, the CPU 1 comes to prepare the camera for photo-taking. The CPU 1 causes the light measuring circuit 2 and the focus detecting circuit 3 to start their actions. The lens 8 is driven to make focus adjustment. When the release button is pushed further down to the end of its full stroke, a switch B 11 turns on. Upon detection of the turning-on of the switch B 11, the CPU 1 energizes the coil of the first clamping magnet 6. The first clamping magnet 6 then releases the locked state of a lever which is provided for springing up a mirror (not shown) arranged to guide an object image from the lens 8 to a viewfinder. With the lever unlocked, the mirror is retracted upward by the lever, and a mirror-up signal 15 is generated to let the CPU 1 know that the mirror has been retracted.

At the same time, the lens diaphragm 9 is caused to be set in a desired aperture position. Upon completion of the mechanical sequence of the mirror-retracting and lens-diaphragm-aperture setting actions, the shutter driving circuit 24 drives the shutter 7 to expose the film to light. After completion of the action of the shutter 7, an exposure end signal 12 is issued to activate the motor 4 to charge the shutter 7. Then, a charge signal 13 is generated to bring the motor 4 to a stop. At about the same time, the motor 5 is actuated to transport the film. Upon completion of the transport of the film, a film transport signal 14 is generated to bring the motor 5 to a stop. The mirror is moved from its retracted position to its position originally obtained before the photo-taking. The lens diaphragm 9 is brought back to its full-open (maximum) aperture position. One cycle of the sequence of camera actions then comes to an end.

FIG. 2 shows the details of the shutter driving circuit 24. Referring to FIG. 2, a leading blade magnet MG3-1 is arranged to release a leading blade of the shutter 7 from a clamped state. A trailing blade magnet MG3-2 is arranged to release a trailing blade of the shutter 7 from a clamped state. A leading blade capacitor C3-1 is provided for driving the leading blade magnet MG3-1. A trailing blade capacitor C3-2 is provided for driving the trailing blade magnet MG3-2. The shutter driving circuit 24 further includes diodes D1 and D2, resistors R1, R2, R3 and R4, a leading blade transistor TR1 for control over the leading blade magnet MG3-1, and a trailing blade transistor TR2 for control over the trailing blade magnet MG3-2. Reference symbol Vcc denotes a power supply voltage. The power source of a camera is a battery in general. Hence, in the case of this embodiment, the power supply voltage Vcc is supplied from a battery through a DC/DC converter (not shown).

The shutter driving circuit arranged as shown in FIG. 2 operates as follows. When the switch A 10, shown in FIG. 1, turns on, the preparation for photo-taking begins. The leading and trailing blade capacitors C3-1 and C3-2 begin to be charged with the power supply voltage Vcc. The capacitors C3-1 and C3-2 are charged until immediately before the shutter 7 begins to operate. Thus, the charging process is brought to a stop immediately before the leading blade of the shutter 7 begins to travel. After that, when a signal from the CPU 1 comes to the leading blade transistor TR1, electric charge stored in the leading blade capacitor C3-1 is supplied to the leading blade magnet MG3-1. The leading blade magnet MG3-1 then releases the leading blade of the shutter 7 from a clamped state to allow the leading blade to travel. Next, in accordance with an exposure time, the CPU 1 sends a signal to the trailing blade transistor TR2. Upon arrival of this signal, electric charge stored in the trailing blade capacitor C3-2 is supplied to the trailing blade magnet MG3-2. The trailing blade magnet MG3-2 then releases the tailing blade of the shutter 7 from a clamped state to allow the trailing blade to travel. An exposure action on the film then comes to an end.

Further, in a case where the length of exposure time, i.e., a period of time from the commencement of travel of the leading blade to the travel of the trailing blade, is longer than a predetermined length of time, for example, 2 sec, the embodiment is arranged to perform control in such a way as to charge again the trailing blade capacitor C3-2 beginning a predetermined length of time, for example, 100 msec, before the trailing blade is allowed to travel. After that, when a signal comes from the CPU 1 to the trailing blade transistor TR2, the electric charge stored in the trailing blade capacitor C3-2 is supplied to the trailing blade magnet MG3-2. The trailing blade magnet MG3-2 then releases the trailing blade from its clamped state to allow the trailing blade to travel. An exposure on the film thus comes to an end.

Further, at a high temperature, spontaneous discharge causes the voltage of the trailing blade capacitor C3-2 to drop to a greater degree than at a low temperature, thereby making it difficult to secure a sufficient voltage for accurately driving the trailing blade magnet MG3-2. To solve this problem, the embodiment is arranged to include a temperature sensor for detecting temperature around the capacitors C3-1 and C32. According to the output of the temperature sensor, a threshold value for the exposure time and a period of time for charging again the trailing blade capacitor C3-2 are adjusted. In a case where the temperature around the capacitors C3-1 and C3-2 exceeds 40° C., the threshold value for the exposure time is set at 1 sec, and the timing for commencement of charging again the trailing blade capacitor C3-2 is set to 200 msec before the travel of the trailing blade. The details of such control will be explained later in the flow chart of FIG. 5.

An operation of the embodiment is next described below with reference to FIG. 3 which is a flow chart.

At a step S1 of the flow of operation shown in FIG. 3, the switch A 10 is checked, in a standby state, to find if the switch A 10 has been turned on with the release button (not shown) pushed halfway. If not, the flow remains in the standby state until the switch A 10 is turned on. If so, the flow proceeds to steps S2, S3 and S4. At the step S2, the light measuring circuit 2 is driven, so that a light measuring computing operation is carried out. At the step S3, the leading blade capacitor C3-1 and the trailing blade capacitor C3-2 begin to be charged with electricity. At the step S4, the focus detecting circuit 3 is driven, so that a focus detecting computing operation is carried out. At a step S5, focus is adjusted by causing the driving circuit 25 to drive the lens 8 on the basis of the result of the focus detecting computing operation. The preparation for photo-taking is completed at the step S5.

At a step S6, the on-state of the switch B 11 brought about with the release button further pushed to the end of its full stroke is detected. With the switch B 11 turned on, the flow proceeds to a step S7. At the step S7, the first clamping magnet 6 is actuated to initiate a sequence of mechanical actions of the camera. At a step S8, a mirror-up action is first performed by unlocking the lever arranged to spring up the mirror (not shown) which is arranged to guide an object image from the lens 8 to the viewfinder. Then, the mirror-up signal 15 is generated. At the same time, the flow proceeds to a step S9 to cause the driving circuit 26 to drive the lens diaphragm 9. At the step S9, the aperture of the lens diaphragm 9 is thus caused to be stopped down to a desired aperture position.

Upon completion of the sequence of mechanical actions of the camera through the above-stated steps, the flow proceeds to a step S10. At the step S10, the charging actions on the leading and trailing blade capacitors C3-1 and C3-2 are brought to a stop. At a step S11, the leading blade of the shutter 7 starts to travel. At a step S12, the result of the light measuring computing operation is checked to find if an exposure time is 2 sec or above. If the exposure time is 2 sec or above, the flow proceeds to a step S14. At the step S14, the trailing blade capacitor C3-2 is caused to be charged again beginning 100 msec before the trailing blade is allowed to travel. At the next step S15, after the charging action on the trailing blade capacitor C3-2 is brought to a stop, the trailing blade is allowed to start traveling in accordance with the exposure time.

If the exposure time is found at the step S12 to be less than 2 sec, the flow proceeds to a step S13. At the step S13, the trailing blade is allowed to start traveling in accordance with the exposure time without charging again the trailing blade capacitor C3-2. At a step S16, the exposure end signal 12 is issued in association with the travel of the trailing blade of the shutter 7 to indicate that an exposure has come to an end. After that, the flow proceeds to a step S17. At the step S17, the mirror is moved down. At a step S18, the driving circuit 26 is caused to shift the position of the lens diaphragm 9 to its full-open aperture position. At a step S19, the charge signal 13 is issued to cause the driving circuit 21 to drive and control the motor 4 for charging the shutter 7, etc. At a step S20, the film transport signal 14 is issued to cause the driving circuit 22 to drive the motor 5 to transport the film. Through these steps, one cycle of the sequence of actions of the camera comes to an end.

In a case where the exposure time of the shutter is not decided, like in the case of bulb photography, the camera is set to charge again the trailing blade capacitor C3-2 for 100 msec after the switch B 11 is turned off and before the trailing blade is allowed to travel.

The embodiment has been described by way of example above as arranged to set the threshold value of exposure time at 2 sec and the timing for starting charging again the trailing blade capacitor C3-2 at 100 msec before the travel of the trailing blade. However, the invention is not limited to such setting values. These values can be set at any values considered to be most apposite to the photo-taking conditions, such as the capacity of the capacitor, a driving voltage, a driving current, a charging power supply, etc. Further, while the embodiment is arranged to use capacitors for storing electric energy, a coil, a piezoelectric element, a rechargeable battery, etc., may be used in place of the capacitors.

Figure 5:
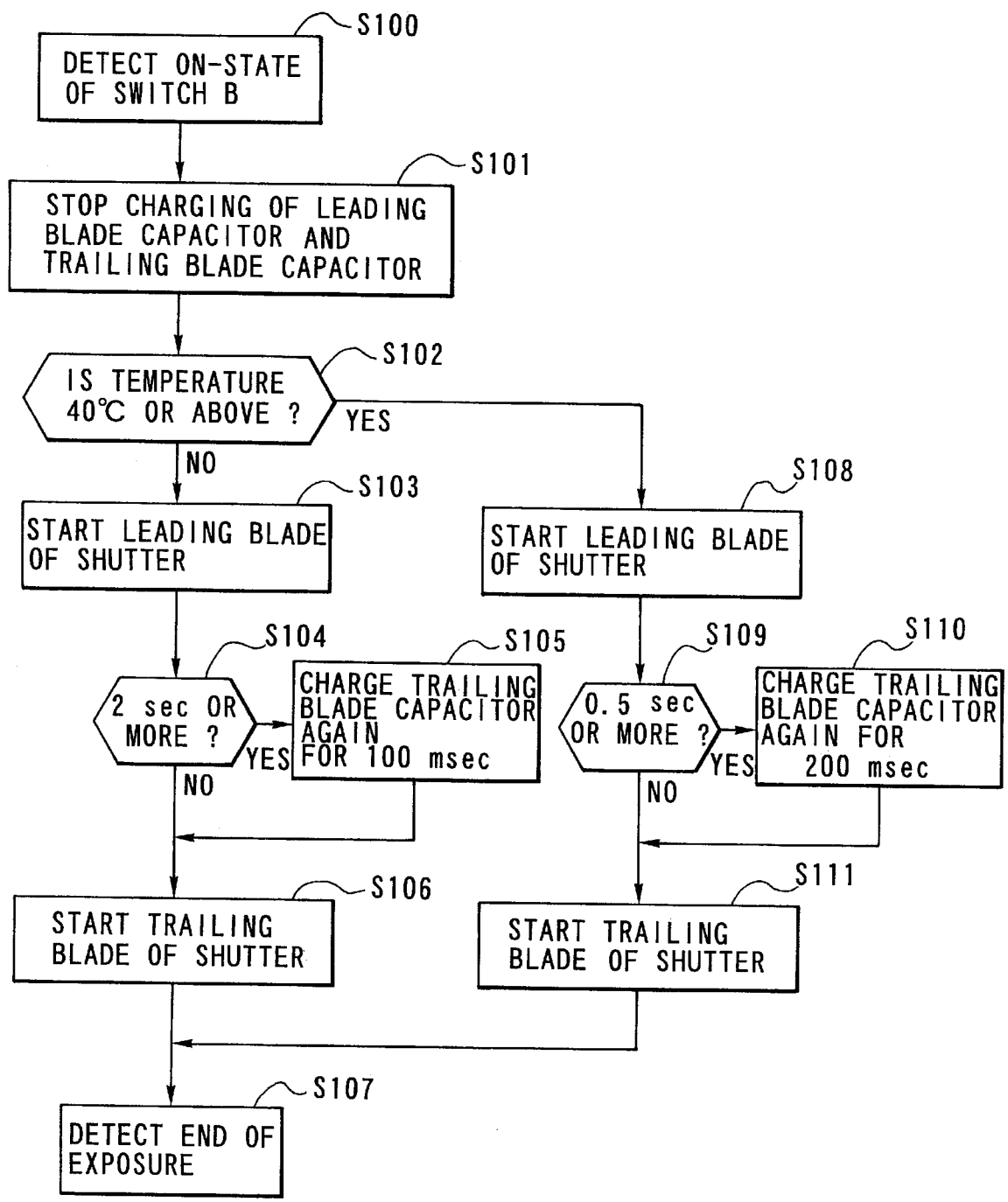
FIG. 5 is a flow chart showing a flow of operation by which the mode of control over a recharging action on a trailing blade driving capacitor is varied according to the output of a temperature sensor.

FIG. 5 is a flow chart showing an example in which the inside temperature of the camera is measured and the threshold value of exposure time and the trailing-blade-capacitor recharging time are adjusted according to the measured temperature. Since the sequence of actions to be carried out in this example is similar to what has been described in the foregoing with reference to FIG. 3, the following description covers only such parts that differ from the actions already described.

At a step S100 of FIG. 5, the switch B 11 turns on with the release button pushed down to the end of its full stroke. At a step S101, the process of charging the leading blade capacitor C3-1 and the trailing blade capacitor C3-2 is brought to a stop.

At a step S102, the output of a temperature sensor which measures the inside temperature of the camera is checked to find if the temperature is 40° C. or above. If so, the flow proceeds to a step S108. At the step S108, the leading blade is allowed to start traveling. At a step S109, a check is made to find if the set value of exposure time is 0.5 sec or more. If so, the flow proceeds to a step S110 to charge again the trailing blade capacitor C3-2 just for a period of 200 msec before a step S111. If not, the flow comes directly to the step S111. At the step S111, the trailing blade is allowed to start traveling.

If the inside temperature of the camera is found at the step S102 to be below 40° C., the flow proceeds to a step S103. At the step S103, the leading blade is allowed to start traveling. At a step S104, a check is made to find if the set value of exposure time is 2 sec or more. If so, the flow proceeds to a step S105 to charge again the trailing blade capacitor C3-2 just for a period of 100 msec before a step S106. If not, the flow comes directly to the step S106 without charging again the trailing blade capacitor C3-2. At the step S106, the trailing blade is allowed to start traveling.

In the case of the flow chart of FIG. 5, the recharging action on the trailing blade capacitor C3-2 is arranged to start either 0.5 sec or 2 sec after the start of the leading blade. However, the start of recharging may be changed variously, for example, to be made 200 msec or 100 msec before the start of travel of the trailing blade.

Figure 6:
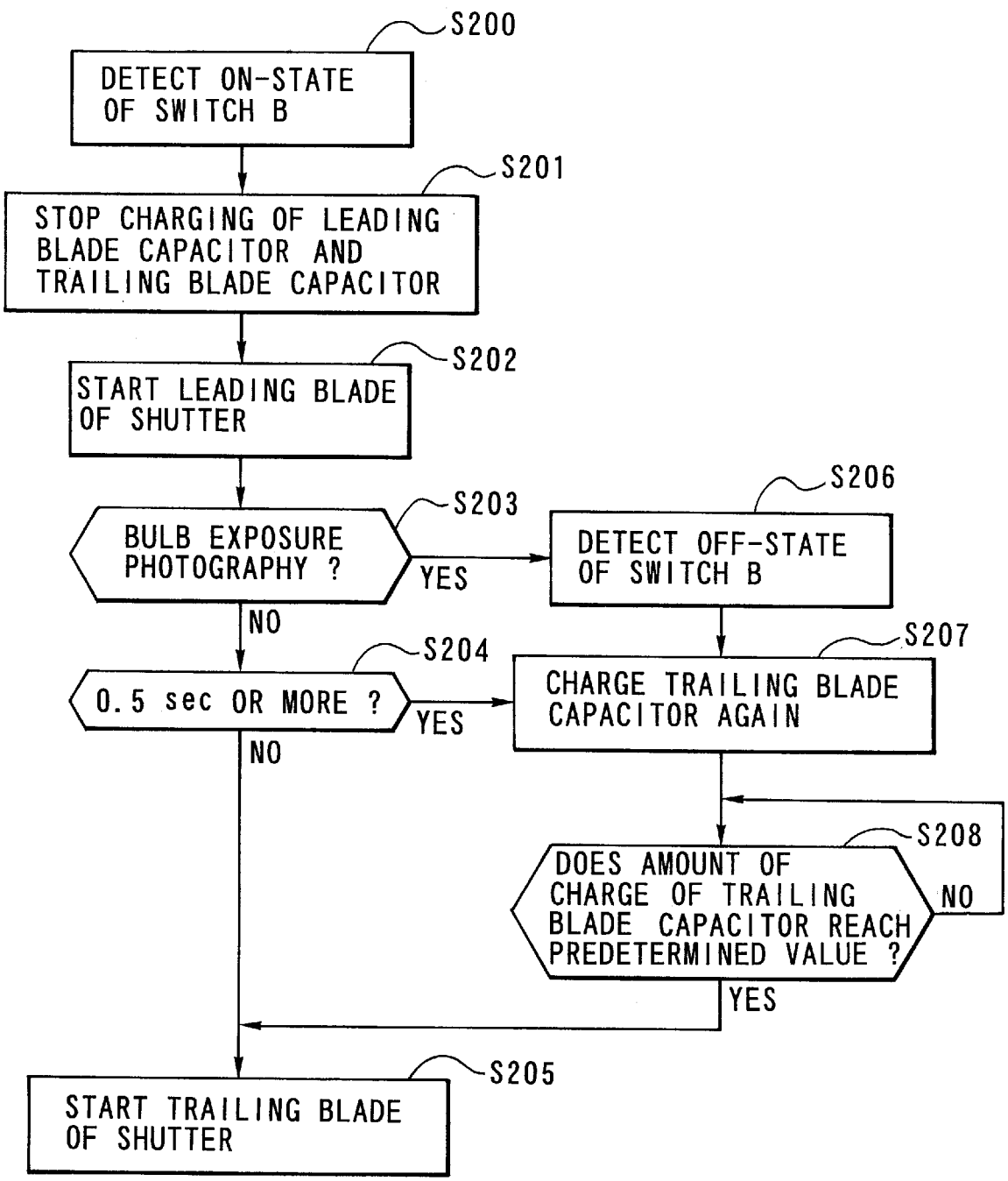
FIG. 6 is a flow chart showing an operation of another embodiment of the invention.

FIG. 6 is a flow chart showing an operation of another (second) embodiment of the invention. In the second embodiment, the recharging action on the trailing blade capacitor C3-2 is not controlled with a period of time of charging, but controlled by measuring the amount of charging.

The sequence of photo-taking actions in the second embodiment is similar to what has been described in the foregoing with reference to FIG. 3. Therefore, the following description of the second embodiment covers only such parts that differ from those of the first embodiment. Referring to FIG. 6, at a step S200, the switch B 11 turns on with the release button pushed to a full extent. At a step S201, the charging actions on the leading blade capacitor C3-1 and the trailing blade capacitor C3-2 are brought to a stop. At a step S202, the leading blade is allowed to start traveling. At a step S203, a check is made to find if the camera is set in a mode of bulb photography. If so, the flow proceeds to a step S206. At the step S206, the switch B 11 is turned off with the release button freed from its fully pushed state. At the next step S207, the trailing blade capacitor C3-2 is charged again from a point of time when the switch B 11 is turned off. At a step S208, a check is made to find if the amount of charging of the trailing blade capacitor C3-2 has reached a predetermined value. If not, the trailing blade capacitor C3-2 is charged further until the amount of charging reaches the predetermined value. When the predetermined value is reached, the flow proceeds to a step S205 to allow the trailing blade to start traveling.

If the camera is found at the step S203 to be not in the mode of bulb photography, the flow proceeds to a step S204. At the step S204, a check is made to find if the exposure time is set at a value which is 0.5 sec or more. If so, the flow proceeds to the step 207 to charge again the trailing blade capacitor C3-2 until the amount of charging of the trailing blade capacitor C3-2 is found to have reached the predetermined value at the step S208. After the step S208, the flow proceeds to the step S205 to allow the trailing blade to start traveling. If the exposure time is found at the step S204 to be less than 0.5 sec, the flow proceeds from the step 204 directly to the step S205 to allow the trailing blade to start traveling without charging again the trailing blade capacitor C3-2.

I claim:

1. A shutter device having a first light blocking structure arranged to initiate an exposure and a second light blocking structure arranged to terminate the exposure, comprising:

a) a first energy storage element arranged to store electric energy for causing said first light blocking structure to start operating;

b) a second energy storage element arranged to store electric energy for causing said second light blocking structure to start operating; and c) a charging control circuit arranged to effect control of charging of said first energy storage element and said second energy storage element, wherein said charging control circuit varies the control of charging in accordance with a set exposure time.

2. A shutter device according to claim 1, wherein said charging control circuit stops charging said first energy storage element and said second energy storage element before said first light blocking structure starts operating, and, then, charges again said second energy storage element after said first light blocking structure starts operating and before said second light blocking structure starts operating if the set exposure time is not less than a predetermined value, or does not charge again said second energy storage element if the set exposure time is less than the predetermined value.

3. A shutter device having a leading blade and a trailing blade, comprising:

a) a first capacitor arranged to store electric energy for causing said leading blade to start operating;

b) a second capacitor arranged to store electric energy for causing said trailing blade to start operating; and c) a charging control circuit arranged to effect control of charging of said first capacitor and said second capacitor, wherein said charging control circuit varies the control of charging of said second capacitor in accordance with a length of time after said leading blade starts operating.

4. A shutter device according to claim 3, further comprising:

a first electromagnet arranged to, when receiving the electric energy stored in said first capacitor, unlock said leading blade so as to cause said leading blade to start operating; and a second electromagnet arranged to, when receiving the electric energy stored in said second capacitor, unlock said trailing blade so as to cause said trailing blade to start operating.

5. A shutter device having a leading blade and a trailing blade, comprising:

a) a first capacitor arranged to store electric energy for causing said leading blade to start operating;

b) a second capacitor arranged to store electric energy for causing said trailing blade to start operating; and c) a charging control circuit arranged to effect control of charging of said first capacitor and said second capacitor, wherein said charging control circuit stops charging said first capacitor and said second capacitor before said leading blade starts operating, and, then, charges again said second capacitor after a predetermined length of time has elapsed from a point of time when said leading blade starts operating.

6. A shutter device according to claim 5, further comprising:

a first electromagnet arranged to, when receiving the electric energy stored in said first capacitor, unlock said leading blade so as to cause said leading blade to start operating; and a second electromagnet arranged to, when receiving the electric energy stored in said second capacitor, unlock said trailing blade so as to cause said trailing blade to start operating.

7. A shutter device according to claim 5, wherein said charging control circuit includes detecting means for detecting an amount of charging in said second capacitor, charges again said second capacitor until the amount of charging in said second capacitor reaches a predetermined value.

8. A shutter device having a leading blade and a trailing blade, comprising:

a) a first capacitor arranged to store electric energy for causing said leading blade to start operating;

b) a first electromagnet arranged to, when receiving the electric energy stored in said first capacitor, unlock said leading blade so as to cause said leading blade to start operating;

c) a second capacitor arranged to store electric energy for causing said trailing blade to start operating;

d) a second electromagnet arranged to, when receiving the electric energy stored in said second capacitor, unlock said trailing blade so as to cause said trailing blade to start operating; and e) a charging control circuit arranged to effect control of charging of said first capacitor and said second capacitor, wherein said charging control circuit stops charging said first capacitor and said second capacitor before said leading blade starts operating and, then, charges again said second capacitor before said trailing blade starts operating.

9. A shutter device according to claim 8, wherein said charging control circuit charges again said second capacitor before said trailing blade starts operating if a set exposure time is not less than a predetermined value, and does not charge again said second capacitor if the set exposure time is less than the predetermined value.

10. A shutter device according to claim 9, wherein said charging control circuit charges again said second capacitor only for a predetermined length of time immediately before said trailing blade starts operating.

11. A shutter device according to claim 8, wherein said charging control circuit includes a temperature sensor, and varies a length of time of charging again said second capacitor in accordance with an output of said temperature sensor.

12. A shutter device according to claim 11, wherein, when the output of said temperature sensor is not less than a predetermined value, said charging control circuit makes the length of time of charging again said second capacitor longer than when the output of said temperature sensor is less than the predetermined value.

13. A shutter device according to claim 8, wherein said charging control circuit includes a temperature sensor, and varies, in accordance with an output of said temperature sensor, a length of exposure time which is used as a threshold value in deciding whether to charge again said second capacitor.

14. A shutter device according to claim 13, wherein, when the output of said temperature sensor is not less than a predetermined value, said charging control circuit makes the length of exposure time which is used as the threshold value in deciding whether to charge again said second capacitor shorter than when the output of said temperature sensor is less than the predetermined value.

15. A camera equipped with a shutter device having a first light blocking structure arranged to initiate an exposure and a second light blocking structure arranged to terminate the exposure, comprising:
   a) a first energy storage element arranged to store electric energy for causing said first light blocking structure to start operating;
   b) a second energy storage element arranged to store electric energy for causing said second light blocking structure to start operating; and
   c) a charging control circuit arranged to effect control of charging of said first energy storage element and said second energy storage element,
       wherein said charging control circuit varies the control of charging in accordance with a set exposure time.

16. A camera equipped with a shutter device according to claim 15, wherein said charging control circuit stops charging said first energy storage element and said second energy storage element before said first light blocking structure starts operating, and, then, charges again said second energy storage element after said first light blocking structure starts operating and before said second light blocking structure starts operating if the set exposure time is not less than a predetermined value, or does not charge again said second energy storage element if the set exposure time is less than the predetermined value.

17. A camera equipped with a shutter device having a leading blade and a trailing blade, comprising:
   a) a first capacitor arranged to store electric energy for causing said leading blade to start operating;
   b) a second capacitor arranged to store electric energy for causing said trailing blade to start operating; and
   c) a charging control circuit arranged to effect control of charging of said first capacitor and said second capacitor,
       wherein said charging control circuit varies the control of charging of said second capacitor in accordance with a length of time after said leading blade starts operating.

18. A camera equipped with a shutter device according to claim 17, further comprising:
   a first electromagnet arranged to, when receiving the electric energy stored in said first capacitor, unlock said leading blade so as to cause said leading blade to start operating; and
   a second electromagnet arranged to, when receiving the electric energy stored in said second capacitor, unlock said trailing blade so as to cause said trailing blade to start operating.

19. A camera equipped with a shutter device having a leading blade and a trailing blade, comprising:
   a) a first capacitor arranged to store electric energy for causing said leading blade to start operating;
   b) a second capacitor arranged to store electric energy for causing said trailing blade to start operating; and
   c) a charging control circuit arranged to effect control of charging of said first capacitor and said second capacitor,
       wherein said charging control circuit stops charging said first capacitor and said second capacitor before said leading blade starts operating, and, then, charges again said second capacitor after a predetermined length of time has elapsed from a point of time when said leading blade starts operating.

20. A camera equipped with a shutter device according to claim 19, further comprising:
   a first electromagnet arranged to, when receiving the electric energy stored in said first capacitor, unlock said leading blade so as to cause said leading blade to start operating; and
   a second electromagnet arranged to, when receiving the electric energy stored in said second capacitor, unlock said trailing blade so as to cause said trailing blade to start operating.

21. A camera equipped with a shutter device according to claim 19, wherein said charging control circuit includes detecting means for detecting an amount of charging in said second capacitor, charges again said second capacitor until the amount of charging in said second capacitor reaches a predetermined value.

22. A camera equipped with a shutter device having a leading blade and a trailing blade, comprising:
   a) a first capacitor arranged to store electric energy for causing said leading blade to start operating;
   b) a first electromagnet arranged to, when receiving the electric energy stored in said first capacitor, unlock said leading blade so as to cause said leading blade to start operating;
   c) a second capacitor arranged to store electric energy for causing said trailing blade to start operating;
   d) a second electromagnet arranged to, when receiving the electric energy stored in said second capacitor, unlock said trailing blade so as to cause said trailing blade to start operating; and
   e) a charging control circuit arranged to effect control of charging of said first capacitor and said second capacitor,
       wherein said charging control circuit stops charging said first capacitor and said second capacitor before said leading blade starts operating and, then, charges again said second capacitor before said trailing blade starts operating.

23. A camera equipped with a shutter device according to claim 22, wherein said charging control circuit charges again said second capacitor before said trailing blade starts operating if a set exposure time is not less than a predetermined value, and does not charge again said second capacitor if the set exposure time is less than the predetermined value.

24. A camera equipped with a shutter device according to claim 23, wherein said charging control circuit charges again said second capacitor only for a predetermined length of time immediately before said trailing blade starts operating.

25. A camera equipped with a shutter device according to claim 22, wherein said charging control circuit includes a temperature sensor, and varies a length of time of charging again said second capacitor in accordance with an output of said temperature sensor.

26. A camera equipped with a shutter device according to claim 25, wherein, when the output of said temperature sensor is not less than a predetermined value, said charging control circuit makes the length of time of charging again said second capacitor longer than when the output of said temperature sensor is less than the predetermined value.

27. A camera equipped with a shutter device according to claim 22, wherein said charging control circuit includes a temperature sensor, and varies, in accordance with an output of said temperature sensor, a length of exposure time which is used as a threshold value in deciding whether to charge again said second capacitor.

28. A camera equipped with a shutter device according to claim 27, wherein, when the output of said temperature sensor is not less than a predetermined value, said charging control circuit makes the length of exposure time which is used as the threshold value in deciding whether to charge again said second capacitor shorter than when the output of said temperature sensor is less than the predetermined value.

* * * * *

UNITED STATES PATENT AND TRADEMARK OFFICE
CERTIFICATE OF CORRECTION

PATENT NO. : 5,940,640
DATED : August 17, 1999
INVENTOR(S) : Akira Karasawa

It is certified that error appears in the above-identified patent and that said Letters Patent are hereby corrected as shown below:

Col. 4, line 26, delete "C32" and insert -- C3-2 --.

Signed and Sealed this

Third Day of April, 2001

Attest:

NICHOLAS P. GODICI

*Attesting Officer*       Acting Director of the United States Patent and Trademark Office